United States Patent [19]

Braibanti

[11] 4,346,119
[45] Aug. 24, 1982

[54] PROCESS FOR THE PREPARATION OF INSTANT COOKING ALIMENTARY PASTE

[75] Inventor: Ennio Braibanti, Milan, Italy

[73] Assignee: Dott. Ingg. M., G. Braibanti & C. S.p.A., Italy

[21] Appl. No.: 213,699

[22] Filed: Dec. 5, 1980

[30] Foreign Application Priority Data

Mar. 10, 1980 [IT] Italy ............................... 20483 A/80

[51] Int. Cl.³ ................................................ A23L 1/16
[52] U.S. Cl. .................................... 426/451; 426/557; 426/511
[58] Field of Search ................ 426/557, 451, 510, 511

[56] References Cited

U.S. PATENT DOCUMENTS 3,192,049 6/1965 Kinsley ............................... 426/557
4,243,690 1/1981 Murakami et al. .................. 426/557

Primary Examiner—Raymond N. Jones
Assistant Examiner—George C. Yeung
Attorney, Agent, or Firm—Karl W. Flocks; Sheridan Neimark

[57] ABSTRACT

A process for the preparation of instant-cooking alimentary paste, mainly of the type based on cereal flours or other flours, characterized in that it comprises the following steps:
- (a) the carrying out of a vaporization treatment, using steam at a temperature of less than 100° C., at atmospheric pressure, on a paste coming from the extrusion stage and having a moisture content of between 25% and 35%;
- (b) the humidification of the paste treated as stated until its moisture content is approximately from 40% to 55%;
- (c) allowing the paste humidified in this way to stand;
- (d) the carrying out of a vaporization treatment of the paste allowed to stand as under (c) above with steam at a temperature of less than 100° C., at atmospheric pressure.

7 Claims, No Drawings

PROCESS FOR THE PREPARATION OF INSTANT COOKING ALIMENTARY PASTE

By instant-cooking, or pre-cooked, alimentary pastes is meant alimentary pastes which are ready for use after simple soaking in hot water, generally at a temperature of between 80° C. and 100° C., for a brief period of time—approximately 3-5 minutes—that is to say without requiring a normal final and prolonged cooking in boiling water.

The alimentary paste industry has for a considerable number of years shown a lively interest in the production of instant-cooking alimentary pastes based on pure fine semolina, or based on semolina and wheat or other cereals in mixture, or on other cereals.

It is known to prepare said types of paste by means of cooking in boiling water at atmospheric pressure, or in an autoclave.

Both such processes, however, entail serious problems which make them scantily advantageous to use; cooking in boiling water at atmospheric pressure is both uneconomical because of the thermal costs it entails and it is also poorly suited to the characteristics of semolina pastes, since these generally have a characteristic and very fine wad format (0.3 to 0.5 mm), which means that it is problematical to obtain an ideal cooking at the high temperature at which operations are performed.

Cooking in an autoclave, on the other hand, gives qualitatively satisfactory results, but is for the most part a batch-wise process and thus does not provide an advantageous industrial-scale output; industrial-scale production should of course be continuous if it is to be advantageous.

To perform this latter method continuously would obviously be both an intricate and expensive operation. Both the methods outlined above, furthermore, have limitations as to the range of shapes of alimentary paste which can be obtained.

The object of the present invention is consequently to embody a process for the production of instant-cooking alimentary paste such as overcomes the problems connected with the known art, and such as proves advantageously applicable on industrial scale. In particular, the present invention sets out to achieve a low-cost continuous process.

To this end, the invention chiefly concerns a method of preparation of instant-cooking alimentary paste of the kind comprising cooking in steam at atmospheric pressure using a vaporizer of, for example, the belt type.

It has, however, been found that a method of this type cannot be immediately applied to the alimentary pastes coming from the extrusion stage; for, if a just-extruded paste is transferred even for longish periods, for example, 10-15 minutes, to the vaporizing or steam-treatment belt, it is impossible to obtain a complete or in any case satisfactory cooking of the product.

This fact finds explanation in that the moisture content of the paste coming from extrusion is only about 30% to 35%. Now, in the cooking step, which is essentially a gelling of the starch contained in the paste, the quantity of water must be sufficient to allow a complete gelling of the starch, or the steam-treatment temperature used must be sufficiently high to allow a complete cooking of the product even with a small amount of water.

With a moisture content of 30% to 35%, as is that of the extruded paste, and at a temperature of 95°-100° C., as is that obtaining with a steam-treatment at atmospheric pressure, it has been found that a complete or in any case satisfactory cooking of the extruded paste cannot be obtained.

If the steam-treatment is given at higher temperatures, this does not solve the aforesaid problem: the quantity of moisture present in the extruded paste (which is 30% as previously stated) would in effect call for a steam-treatment temperature of at least 110°-115° C. and thus the use of autoclaves, and this would mean relapsing into a condition involving the difficulties mentioned previously in connection with this type of treatment.

As stated heretofore, an attempt to solve the problem of obtaining a complete cooking could be made by increasing the moisture content of the paste coming from extrusion, before giving it a steam-treatment at a temperature of less than 100° C.

In seeking an ideal solution in this direction, the invention has had to take account of various types of problem, briefly mentioned below:

starting out from the supposition that, in order to obtain a satisfactory degree of cooking at a steam-treatment temperature of approximately 95°-100° C., it would be ideal to have a degree of moisture of the paste of approximately 40% to 55%, it was first attempted to raise the moisture content of the extruded paste by wetting it immediately after extrusion. However, this manner of operating led to a surface scaling of the paste—which, as has been said, is of fine wad format—and thus made it impossible to continue the processing.

Another attempt was made by adding water so as to wet the paste during the steam-treatment; but in this case, too, unacceptable difficulties were encountered, such as an exaggerated tendency of the paste to become sticky when steam-treated for any fairly lengthy period of time; moreover, the said method of operating does not certainly provide a satisfactory final degree of cooking of the alimentary paste.

Said experimental results having been taken into due account, it has now been surprisingly found that, according to the present invention, alimentary paste of the instant-cooking type based on cereal flours or other flours, can be produced in an entirely satisfactory manner—thus achieving the object it was set out to achieve with the invention—by performing a process of preparation of said paste characterized in that it comprises the steps of:

(a) giving a vaporization treatment to a paste coming from the extrusion stage having a moisture content of approximately between 25% and 35%, using steam at a temperature of between 95° C. and 100° C., preferably for a time of approximately 2 to 5 minutes, at atmospheric pressure;

(b) wetting the paste thus treated until a degree of moisture is obtained comprised approximately between 40% and 55%;

(c) allowing the thus-wetted paste to stand for a period of time ranging preferably from approximately 10 to 25 minutes;

(d) giving the paste treated as under (c) above a vaporization treatment, using steam at a temperature comprised between 95° C. and 100° C., for a period of time preferably of approximately 2 to 5 minutes, at atmospheric pressure.

The invention as substantially defined above makes it possible to obtain a final product, that is to say, an instant-cooking alimentary paste, possessing absolutely satisfactory characteristics, and with the use of short steam-treatment times with steam at a temperature of or less than 100° C., and thus with substantially contained energy costs.

The final product obtained with the process according to the invention shows that the treatment it receives is a uniform treatment. This finds explanation in the following considerations: a wetting according to said step (b) which does not at the same time cause a scaling of the paste is made possible by the fact that the vaporization according to said step (a) confers on the paste a partial gelatinization, or gelling, of the starch present, of a kind sufficient to make the product firm enough to keep its shape even if it receives subsequent wettings.

Moreover, the step of allowing the wetted paste to stand allows the water sprayed onto its surface to penetrate inside the paste, distributing itself uniformly, until the outer surface is practically dry.

The uniform penetration of the wetting water inside the paste gives the advantage of allowing the starch to be gelled absolutely uniformly, with consequent absolutely uniform cooking, during the subsequent vaporization step, while the dryness of the outer surface gives the added advantage of preventing the paste from sticking to the vaporization belt in said subsequent step (d).

To provide a better description of the characteristics and advantages of the invention as previously defined essentially, there is set out below an example of actuation of the proposed process, which example is not limiting.

EXAMPLE

1. A paste mixture was prepared having a moisture content of approximately 30-32%, and was then extruded at a pressure of 100 atm. The formats of the extruded product was the so-called "short-cut paste".

2. The extruded paste was gently dried to reach a moisture content of approximately 25-35%, depending on the format.

3. The paste was treated on the steam-treatment belt for 90 to 180" at a temperature of 95°-100° C., the layer of paste deposited on the belt being about 2-5 cm. It should be clarified that the extent of said layer depends on the conveyor belt advance speed, which affects the accumulation of paste at the extruder outlet. At the end of said vaporization the moisture of the paste was approximately 5-30%.

4. The paste was then wetted with water to have a moisture of approximately 40-45%.

5. After completion of the wetting, the product was allowed to stand in a special apparatus keeping it in continuous movement, for about 5-10 minutes. At the end of this period the paste is perfectly "smooth", i.e. not sticky, and is dry on its surface.

6. The paste was again treated on the vaporization belt, with a layer of product of about 2-5 cm, at a temperature of 100° C. for a vaporization time of 4 minutes.

7. Finally, the product was given a final drying to reach a pre-determined degree of humidity.

It is important to stress that the experimental values of the operating parameters reported in the Example are to be understood as indicative only, and not limiting.

The temperature and the treatment times during the various steps of the process according to the invention can in effect be varied in relation to the particular type of paste being treated, and its format.

According to a variant of the process hitherto described, provision is made for a product pre-drying step before the final drying step.

I claim:

1. A method of preparing instant-cooking alimentary paste, comprising the following steps:
   (a) introducing a mixture of cereal flour and water into an extrusion zone to form a paste, and steam-treating said paste coming from the extrusion zone and having a moisture content of about 25-35%, using steam at a temperature of at least about 95° but no greater than 100° C., at atmospheric pressure, and for a time sufficient to effect only partial gelatinization of said extruded paste;
   (b) wetting the partially gelatinized paste to increase the moisture content to approximately 40% to 55%,
   (c) allowing the so-wetted paste to stand for a time sufficient to permit the moisture to become substantially evenly distributed in said paste;
   (d) steam-treating said paste treated from stage (c), with steam at a temperature of at least about 95° but no greater than 100° C., at atmospheric pressure to effect further gelatinization and cooking thereof.

2. A process according to claim 1, further comprising partially drying the paste coming from the extrusion, prior to the steam treatment in said step (a).

3. A process according to claim 1, comprising a final drying of the product coming from the treatment according to said step (d).

4. A process according to claim 1, wherein said steam treating of steps (a) and (d) each has a duration of about from 2 to 5 minutes.

5. A process according to claim 3, further comprising a step of partial drying of the product before said final drying step.

6. A process according to claim 1, wherein step (c) is carried out for approximately 10-25 minutes until the outer surface of the paste has become practically dry.

7. A process according to claim 1, wherein step (b) is carried out to provide a degree of moisture of approximately 40-45%.

* * * * *